United States Patent
Petersson et al.

(10) Patent No.: US 11,432,294 B2
(45) Date of Patent: Aug. 30, 2022

(54) RESOURCE EFFICIENT BEAM MANAGEMENT

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Gothenburg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 189 days.

(21) Appl. No.: 16/601,741

(22) Filed: Oct. 15, 2019

(65) Prior Publication Data

US 2021/0112558 A1   Apr. 15, 2021

(51) Int. Cl.
*H04W 72/04* (2009.01)

(52) U.S. Cl.
CPC ..... *H04W 72/0493* (2013.01); *H04W 72/042* (2013.01); *H04W 72/044* (2013.01)

(58) Field of Classification Search
CPC ............. H04L 25/0226; H04L 5/0094; H04W 72/1257; H04W 72/046; H04W 72/14; H04B 7/0695
See application file for complete search history.

(56) References Cited

U.S. PATENT DOCUMENTS

| 2016/0337971 A1* | 11/2016 | Bhargava | H04W 28/021 |
| 2019/0132033 A1* | 5/2019 | Akkarakaran | H04W 52/04 |
| 2019/0306924 A1* | 10/2019 | Zhang | H04W 72/046 |

OTHER PUBLICATIONS

International Search Report and Written Opinion issued in International Application No. PCT/EP2020/077210 dated Nov. 27, 2020 (15 pages).
Qualcomm Inc: "Beamformed CSI-RS design for CSI reporting class B", 3GPP Draft; R1-155736, 3rd Generation Partnership Project (3GPP), Mobile Competence Centre; 650, Route Des Lucioles; F-06921 Sophia-Antipolis Cedex; France vol. RAN WG1, No. Malmo, Sweden; Oct. 5, 2015-Oct. 9, 2015 Oct. 4, 2015 (Oct. 4, 2015), XP051002564.
Huawei et al: "Efficient utilization of BF CSI-RS", 3GPP Draft; R1-162599, 3rd Generation Partnership Project (3GPP), Mobile Competence Centre; 650, Route Des Lucioles; F-06921 Sophia-Antipolis Cedex ; France vol. RAN WG1, No. Busan, Korea; Apr. 11, 2016-Apr. 15, 2016 Apr. 2, 2016 (Apr. 2, 2016), XP051080287.
3GPP TS 38.321 V15.3.0 (Sep. 2018), 3rd Generation Partnership Project; Technical Specification Group Radio Access Network; NR; Medium Access Control (MAC) protocol specification, September (Release 15).

* cited by examiner

*Primary Examiner* — Joshua L Schwartz
(74) *Attorney, Agent, or Firm* — Rothwell, Figg, Ernst & Manbeck, P.C.

(57) ABSTRACT

A base station transmits to a first UE beam management configuration information that identifies (directly or indirectly) a resource and indicates to the UE that the identified resource will be used by the base station to transmit a reference signal for use by the first UE in performing a beam management procedure, and then the base station refrains from using the identified resource to transmit the reference signal, and, instead, uses the identified resource to transmit data (e.g., user data or other information) to a second UE.

16 Claims, 10 Drawing Sheets

RESOURCE EFFICIENT BEAM MANAGEMENT

TECHNICAL FIELD

Disclosed are embodiments related to resource efficient beam management.

BACKGROUND

1. Beam Management

Narrow beam transmission and reception schemes are needed at higher frequencies to compensate for high propagation loss. A suitable transmission and reception point (TRP) transmit (TX) beam for each UE is expected to be discovered and monitored by the network (e.g., a base station) using measurements on downlink reference signals (RSs) used for beam management. Such downlink reference signals include Channel State Information RS (CSI-RS) and SSB. Beam management RSs can be transmitted periodically, semi-persistently or aperiodically (event triggered) and they can be either shared between multiple UEs or be UE-specific. The SSB are transmitted periodically and are shared for all UEs. In order to find a suitable TRP TX beam the TRP transmits CSI-RS/SSB using different TRP TX beams and the UE performs RSRP measurements on the received reference signals and reports back the N best TRP TX beams and their corresponding RSRP values (where N can be configured by the network).

Figure 2A:
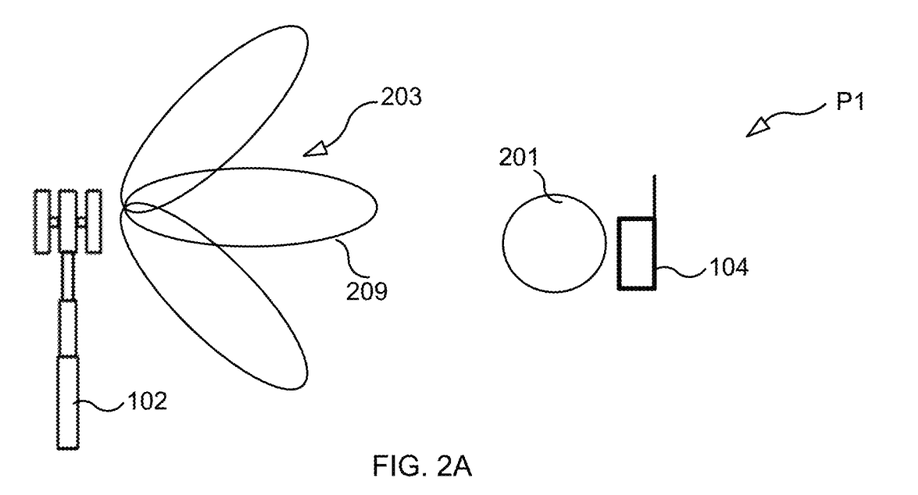
FIGS. 2A, 2B, and 2C illustrate P1, P2, and P3 beam sweeps, respectively.
Figure 2B:
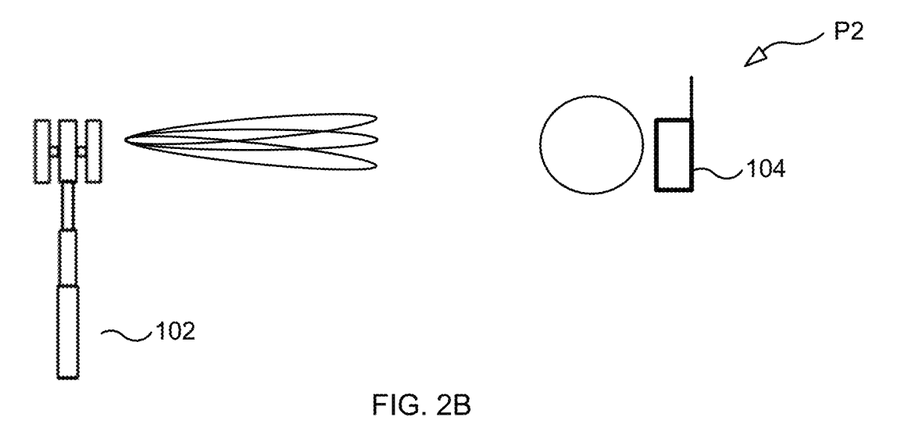
Figure 2C:
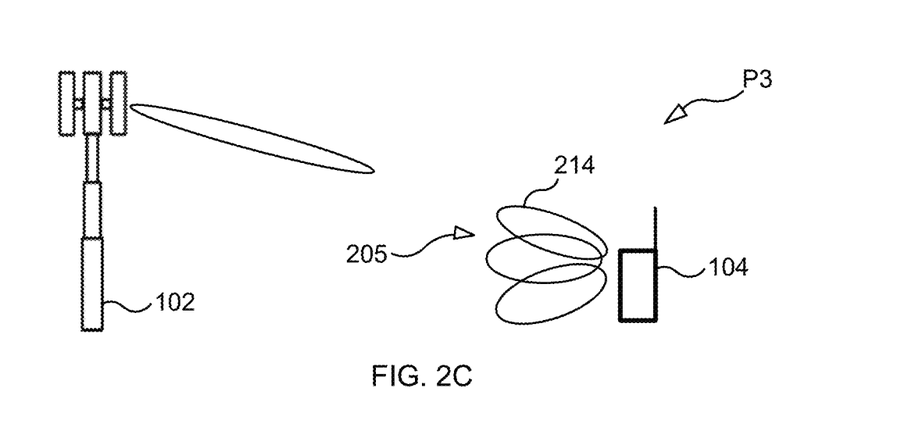

Typically, a base station makes use of three different beam management procedures. These three procedure are knows as: the P1 procedure, the P2 procedure, and the P3 procedure, and are illustrated in FIGS. 2A, 2B, and 2C, respectively. The P1, P2, and P3 procedures are also known as the P1 beam sweep, P2 beam sweep, and P3 beam sweep, respectively.

In the P1 procedure shown in FIG. 2A, a base station 102 uses TX beams having large beamwidths. Beam reference signals transmitted using the TX beams are transmitted periodically and are shared between multiple UEs (including UE 104). Examples of the periodic beam reference signals are periodic CSI-RS and SSB. After UE 104 receives the reference signals, UE 104 may report to base station 102 the N best TRP TX beams and their corresponding RSPR values. The beam reporting from UE 104 to base station 102 can be performed in a periodic manner, a semi-persistent manner, or in aperiodic manner. The P1 procedure may be used to find a coarse direction of a UE 104 with respect to base station 102.

After determining the coarse direction of UE 104, in the P2 procedure shown in FIG. 2B, base station 102 uses narrower TRP TX beams covering the area corresponding to the TRP TX beam selected as a result of performing the P1 procedure. In the P2 procedure, base station 102 may transmit reference signals in aperiodic or semi-persist manner. The P2 procedure may be performed more frequently than the P1 procedure to track UE 104's movements or changes in the radio environment. The P2 procedure may be used to select a suitable narrow TRP TX beam for use in communicating with UE 104.

More specifically, during the P2 beam sweep, UE 104 measures RSRP for each of the beams in the set of TRP beams 203 (using a fixed UE RX beam 201) and sending back to the base station 102 the CSI-RS resource index(s) (CRI(s)) corresponding to the highest RSRP(s), where each CRI corresponds to one of the TRP TX beams 203. During such P2 beam sweep it is expected that UE 104 will apply a wide beam 301 (a.k.a., a non-directional beam or omni-directional beam) (e.g. the widest beam that the UE is able to generate) so that as many propagation paths as possible between the base station 102 and the UE 104 are captured by the P2 beam sweep.

The P3 procedure is a procedure that enables UE 104 to select a "best" UE receive (RX) beam. For example, after finding a suitable narrow TRP TX beam as a result of performing a P2 beam sweep, in the P3 procedure shown in FIG. 2C, base station 102 transmits a burst of reference signals using one narrow beam (e.g., the narrow TRP TX beam selected as a result of the P2 procedure) in aperiodic or semi-persistent manner. The UE 104 uses different receiving (RX) beams to receive signal(s) from base station 102 to find a suitable RX beam at UE 104. That is, UE 104 can sweep through different UE RX directional beams 205, perform measurements on the CSI-RS and select a preferred UE RX directional beam (e.g., UE RX beam 214). How the UE determine the candidate UE RX beams is up to UE implementation. The P3 procedure may be performed frequently to compensate for blocking and/or UE rotation.

Figure 3:
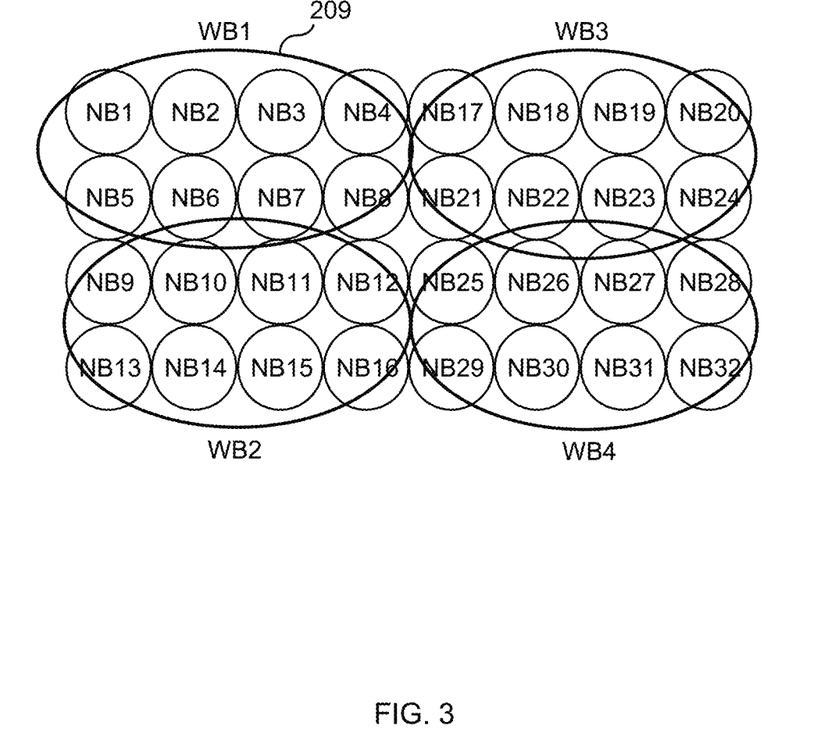
FIG. 3 illustrates various wide beams and narrow beams.

FIG. 3 illustrates an example of beam sets including narrow beams (NB1, NB2, . . . ) and wide beams (WB1, WB2, . . . ). The wide beams may be used in the P1 procedure described above to find a coarse direction of UE 104 with respect to base station 102. The narrow beams may be used in the P2 procedure to find a narrow TX beam that is suitable for data transmission to UE 104.

One way of selecting narrow beams in the P2 procedure is determining which of the wide beams used in the P1 procedure performs the best in terms of RSRP values and selecting narrow beams that are confined within the angular coverage of the determined wide beam. For example, in the exemplary P1 procedure shown in FIG. 2A, wide beam 209 was the best wide beam. Thus, in P2 procedure shown in FIG. 2B, the narrow beams confined within angular coverage of the wide beam 209 are selected.

2. mmWave Antenna Implementation

There are three different implementations of beamforming at a TRP—analog beamforming, digital beamforming, and hybrid beamforming. Digital beamforming is the most flexible solution among the three but costs the most due to a large number of required radios and baseband chains. Analog beamforming is cheaper to manufacture as compared to the digital beamforming due to a reduced number of radios and baseband chains. Hybrid beamforming is a compromise between the analog beamforming and the digital beamforming. But the analog beamforming is the least flexible solution among the three. Another drawback of the analog beamforming is that a TRP can only transmit or receive in one beam at a time (assuming one panel, and the same beam for both polarizations, which typically is the case in order to counteract dropped signal strength due to polarization mis-matching). This is extra problematic for the traffic profile that can be seen in today's communication systems where the majority of data sessions consist of small packages. Even though a UE only has a small package to send or receive, one analog beam that covers a whole carrier is needed to convey that package, which leads to poor resource efficiency (unless other users can be frequency multiplexed using the same analog beam).

3. Spatial QCL Definition

In new radio, the term—spatial quasi-location (QCL)— has been adopted and applies to a relationship between antenna port(s) of two different downlink (DL) reference signals (RSs). If two transmitted DL RSs are configured by a base station to be spatially QCL at a UE receiver, then the UE may assume that the first DL RS and the second DL RS are transmitted with approximately the same transmission spatial filter configuration. Thus, the UE may use approximately the same receiving (RX) spatial filter configuration to receive the second DL RS as it is used to receive the first DL RS. In this way, spatial QCL is a term that assists in the use of analog beamforming and formalizes the notion of the "same UE Rx beam" over different time instances.

4. Configuration of CSI-RS for Beam Management

In Long-Term Evolution (LTE), there may be a problem with Physical Downlink Control Channel (PDCCH) congestion (e.g., the need for PDCCH signaling exceeds the PDCCH capacity of a network). This congestion problem can be even more severe for new radio (NR) because more and more communication devices are scheduled (instead of being transmitted periodically or semi-persistently). Due to this congestion problem, signal transmission during beam management procedures (e.g., like the P2 procedure or the P3 procedure) may be performed semi-persistently instead of aperiodically, to mitigate the problem of PDCCH congestion.

Due to that a limited number of CSI-RS resource sets can be configured for a UE, and that the more CSI-RS resource sets that are configured the more Radio Resource Control (RRC) signaling is needed, there is a desire to keep the number of configured CSI-RS resource sets as small as possible. Also, the CSI-RS resource sets used for P2 and P3 beam sweeps for a UE is expected to be fixed during the whole communication session, since re-configuration of P2/P3 beam sweep (for example changing the number of CSI-RS resources in one CSI-RS resource set used for a P2/P3 beam sweep) requires RRC signaling (regardless if they are aperiodic, semi-persistent or periodic), which is heavy weight and introduce latency and overhead signaling in the system.

CSI-RS used for beam management are expected to be configured over the whole active BWP in order to get more reliable measurements for beam selection.

CSI-RS used for beam management might also consist of two-port CSI-RS resources, which differs compared to SSB that only consist of a single port. When using two-port CSI-RS resources, it is expected that the two ports will be transmitted with mutually orthogonal polarizations in order to reduce the risk of polarization mismatching, which in turn will lead to more reliable beam selections. For two-port CSI-RS resources used for beam management the UE should take the linear average of the RSRP received from the two CSI-RS ports. It could also be noted that for beam management procedures each CSI-RS resource will be transmitted in one OFDM symbol, regardless of how many ports the CSI-RS resource consist of, hence evaluating 4 different TRP beams for both polarizations will take only four OFDM symbols when using two-port CSI-RS resources while doing the same for single-port CSI-RS resources will take 8 OFDM symbols.

SUMMARY

Certain challenges exist. For example, in some situations some resources (frequency, time, and/or port) included in a CSI-RS resource set used for P2 or P3 beam sweep for a first UE might be better used for other things (like transmitting data to a second UE), which makes the CSI-RS beam management procedures sub-optimal.

Accordingly, this disclosure proposes that, after the first UE is configured to expect that a certain set of one or more resources (e.g., a resource element, which is consists of one OFDM sub-carrier during one OFDM symbol interval) will be used by the base station to transmit a reference signal to the first UE, the base station will instead use the resource(s) to transmit data to the second UE. That is, the base station transmits to the first UE beam management configuration information that identifies (directly or indirectly) a resource (e.g., a CSI-RS resource, a set of one or more REs) and indicates to the UE that the identified resource will be used by the base station to transmit a reference signal for use by the first UE in performing a beam management procedure, and then the base station refrains from using the identified resource to transmit the reference signal, and, instead, uses the identified resource to transmit data (e.g., user data or other information) to a second UE.

For instance, in one embodiment, the base station "blanks" transmission of some CSI-RS resources (corresponding to some OFDM symbols) in a CSI-RS resource set used for beam management. The base station then performs transmission (e.g., PDCCH, PDSCH, etc) to one or multiple other UEs on the OFDM symbols that where released from blanking the CSI-RS resources of the beam management procedure. The other UEs can be located anywhere since the base station uses an arbitrary beam for the blanked OFDM symbols.

In another embodiment, the base station blanks transmission on a part of the frequency band (e.g., one or more particular sub-carriers) that the CSI-RS resources belonging to a CSI-RS resource set used for beam management is configured for. Since a narrower bandwidth now is used for the CSI-RS resources for the beam management procedure, the beam selection will be less reliable (especially for UEs that is already in poor coverage), however, the base station might anyway do this in case the resources are need for serving another UE). The base station then performs transmission to one or multiple other UEs on the part of frequency band that were blanked. If the base station only has one TRP panel, and since the same TRP beams is used for the whole frequency band, the other UEs need to be located in directions of the TRP beams that are used for the beam management procedure. In case the base station has multiple panels (covering the same frequency band), one panel can be used for the beam management procedure and another panel can be used for the other UEs.

In yet another embodiment, a UE has been configured with two-port CSI-RS resources for beam management and the base station has a panel with two polarizations, and the base station transmits one CSI-RS port per polarization during beam management procedures. In this scenario, the base station blanks transmission for one CSI-RS port of the two-port CSI-RS resources belonging to a CSI-RS resource set used for beam management, and the base station then use one polarization of the TRP panel for transmission to other UE(s). Since the CSI-RS for beam management and the data for the other UE(s) are located on the same frequency/time resources, it is preferred that the TRP beam(s) used for the beam management procedure and the TRP beam(s) used for data transmission are pointing in different directions to minimize the signals intended for the different UEs to interfere with each other.

A main advantage of the embodiments is that the base station can decide, based on certain factors, to use a resource that a first UE expects will be used by the base station to transmit a reference signal for use by the first UE for more urgent needs (e.g. for the transmission of data to a second UE). As a specific example, if the load on the base station is very high such that the base station has few non-configured resources that is can use to transmit data to the UEs that the base station is serving, the base station can decide to use a configured resource to transmit data to one or more UEs. In this way, resources can be used more efficiently.

BRIEF DESCRIPTION OF THE DRAWINGS

The accompanying drawings, which are incorporated herein and form part of the specification, illustrate various embodiments.

DETAILED DESCRIPTION

Figure 1:
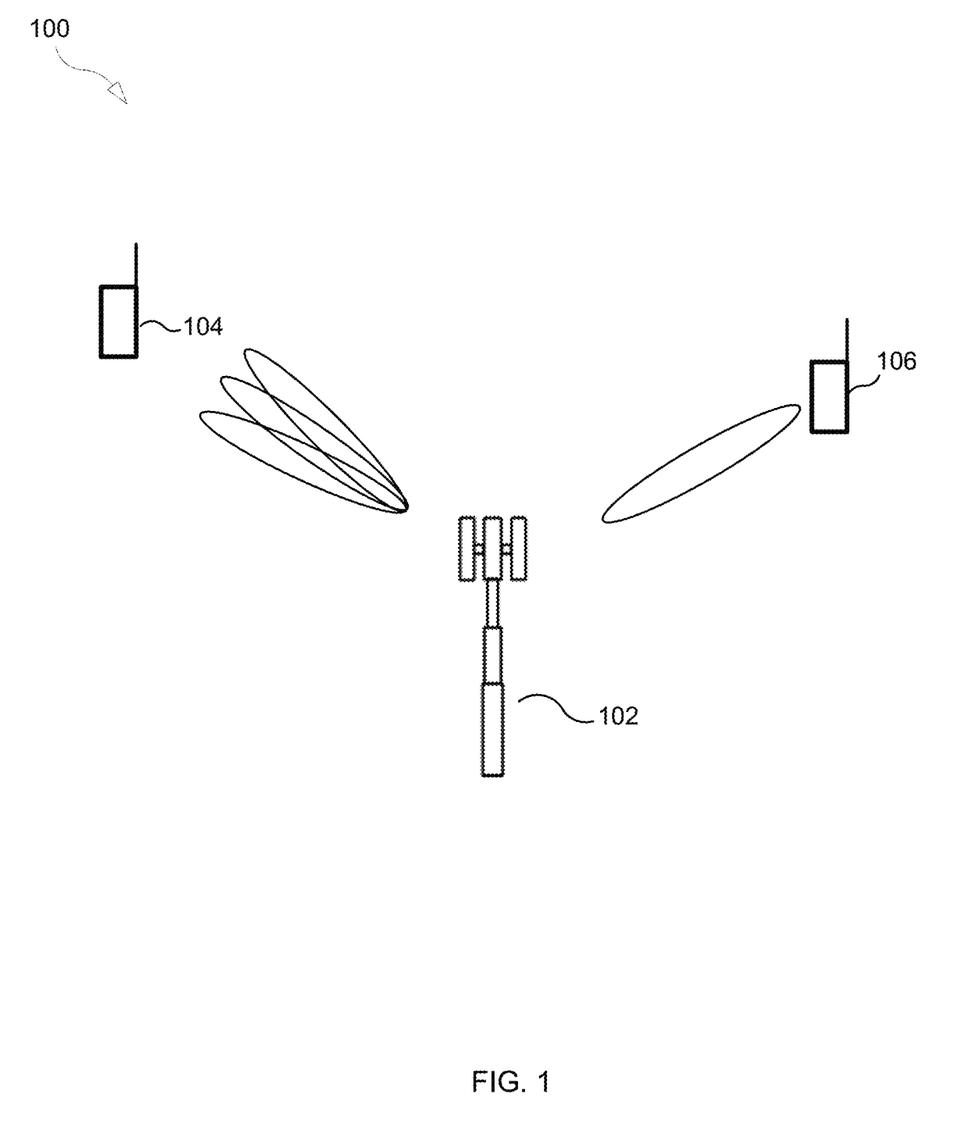
FIG. 1 illustrates a part of an exemplary communication system according to some embodiments.

FIG. 1 shows an exemplary wireless communication system 100 according to some embodiments. The system 100 comprises a base station 102, a first UE 104, and a second UE 106.

Each of UE 104 and the UE 106 may be any device capable of wireless communicating with base station 102. For example, each of UE 104 and the UE 106 may be a mobile phone, a tablet, a laptop, a sensor (or other internet of things (IoT) device), or any other device with wireless communication capabilities. The base station 102 may be any network entity that is capable of wirelessly communicating with UEs and providing network access to the UEs. For example, in one embodiment base station 102 is a 5G base station (gNB).

As explained with respect to FIGS. 2A-2C, to find a suitable beam (e.g., a TRP TX beam or a UE RX beam), base station 102 may transmit beam management reference signals to UE 104 using one or more TRP TX beams. These DL beam management reference signals are transmitted to UE 104 using a set of resources that are known to the UE.

Figure 8:
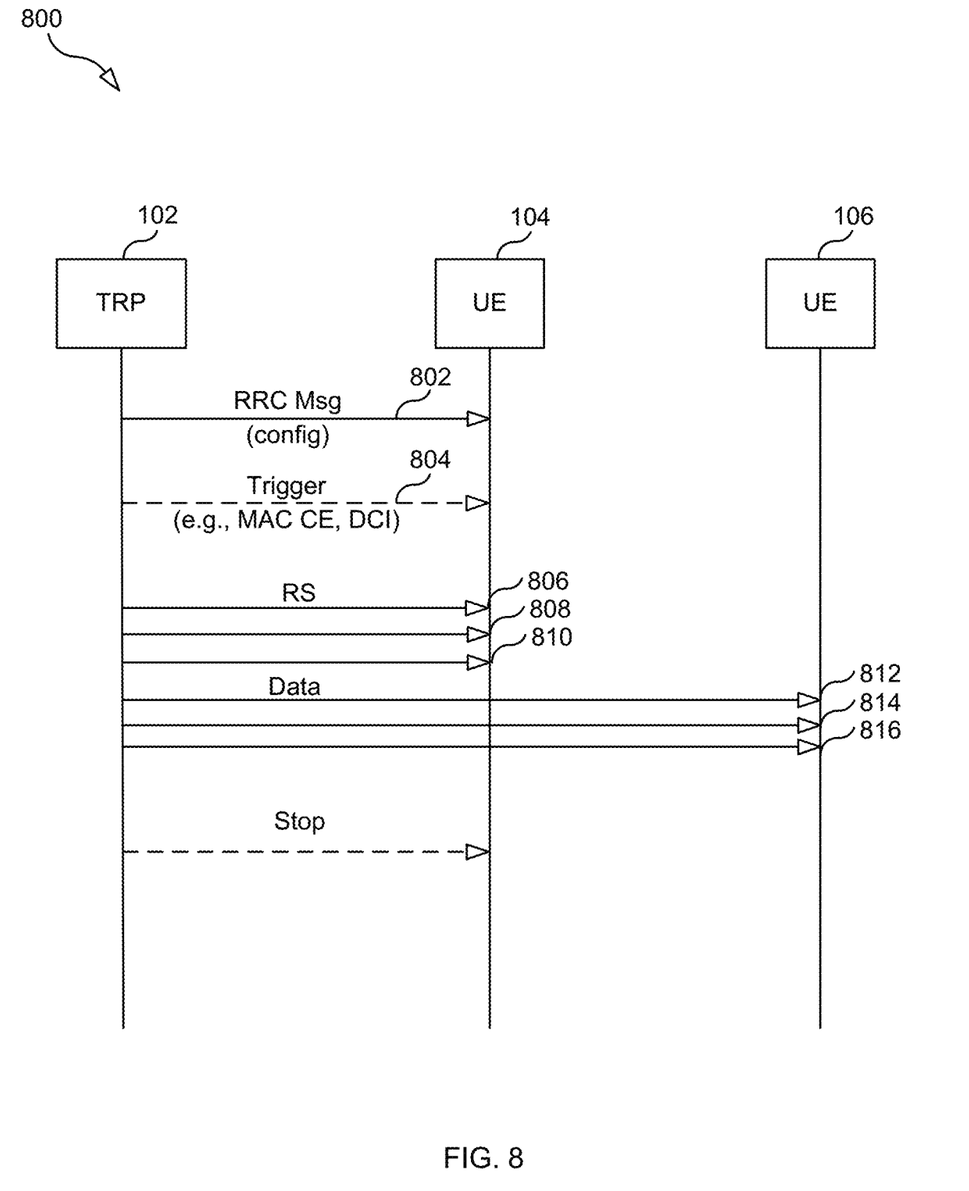
FIG. 8 illustrates an example data flow.

For example, as shown in FIG. 8, in some embodiments, base station 102 transmits a message 802 to UE 104, which message 802 identifies (directly or indirectly) the set of resources (e.g. a set of resource elements) that are used by base station 102 to transmit the beam management reference signals to UE 104. Message 802 may be an RRC message (e.g., an RRC Reconfiguration message) that contains one or more resource sets. For example, the RRC message may be an RRC Reconfiguration message that contains a sequence of resource set IEs, where each resource set IE comprises information identifying a set of one or more resources, and each resource set IE has a resource set identifier for identifying the resource set. This resource set identifier is also known as the "index" of the resource set. For the periodic transmission of beam management reference signals, message 802 may include an indicator indicating that the resource set is for configuring the UE to measure the beam management reference signals periodically and may include information regarding the periodicity.

For beam management RSs transmitted semi-persistently or aperiodically (event triggered), base station 102 transmits to UE 104 a trigger message 804 that includes at least one resource set identifier that identifies one of the resource sets provided to UE 104. For example, the trigger message 804 may include an index of a resource set (e.g., an NZP-CSI-RS-ResourceSet) containing semi persistent or triggered resources (e.g., NZP CSI-RS resources). In this way message 804 identifies (at least indirectly) one or more resources. Message 804 may be a MAC Control Element (MAC CE) (see e.g., 3GPP TS 38.321 V15.3.0 at section 6.1.3.12) or Downlink Control Information (DCI).

Blank OFDM Symbols for Beam Management Procedure

Figure 4:
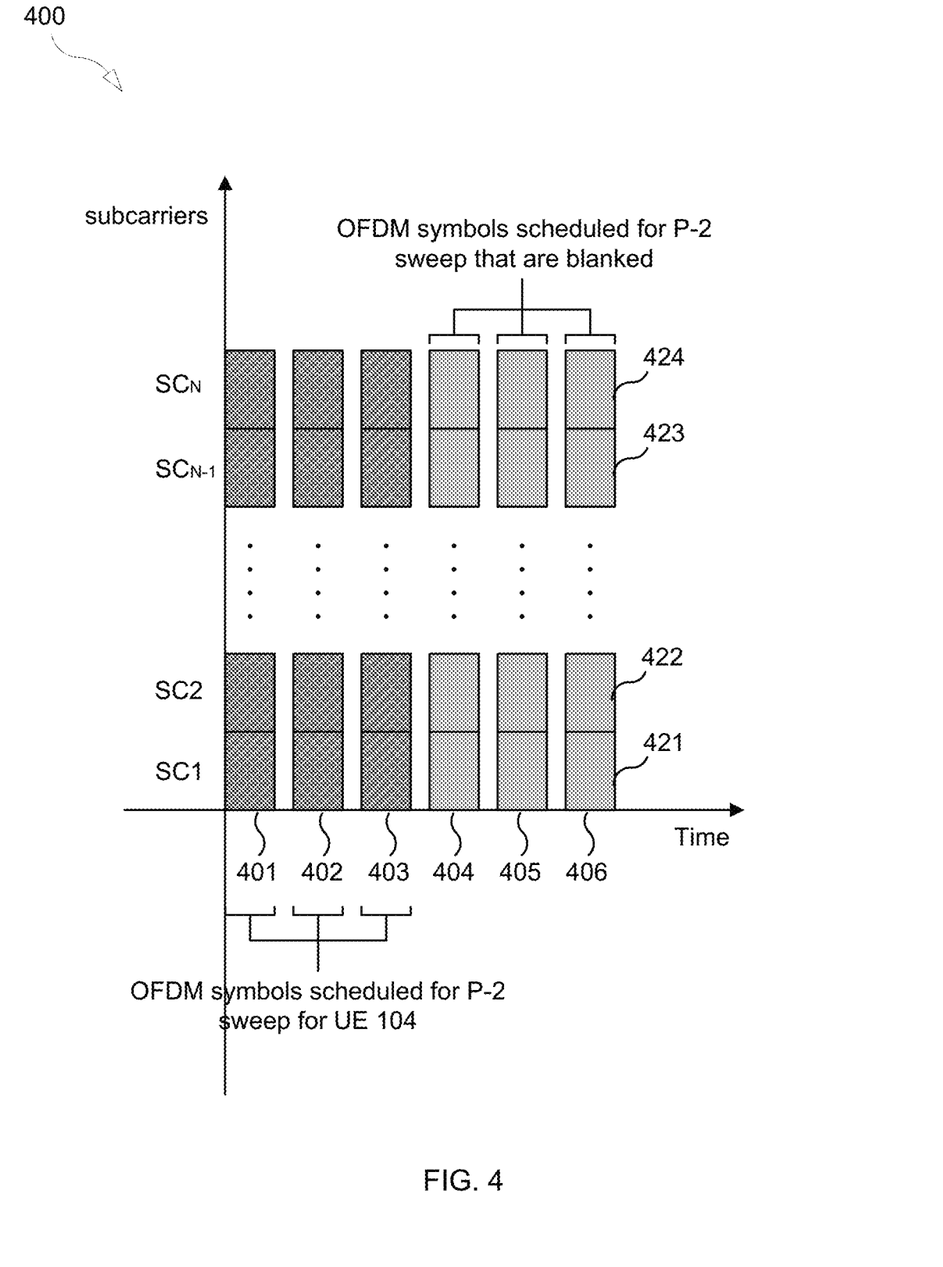
FIG. 4 illustrates the use of beam management resources according to an embodiment.

FIG. 4 illustrates an example embodiment. In this example, UE 104 is configured with a CSI-RS resource set with six CSI-RS resources used for a P2 beam sweep. A CSI-RS resource comprises a set of N (N>0) resource elements within an OFDM symbol interval. For example, CSI-RS resource 406 consists of REs 421, 422, 423, and 424, all of which are within the same OFDM symbol. Typically one CSI-RS resource used for beam management will cover the whole bandwidth of that carrier. Also, it is typical that each CSI-RS resource covers the same frequency band, as is illustrated in FIG. 4. The time domain behavior of the CSI-RS resources can be either aperiodic, semi-persistent or periodic.

During one of the P2 sweeps, base station 102 determines that it needs some resources for transmission to another UE (UE 106). Base station 102 therefore blanks transmission of three out of the six CSI-RS resources (i.e., the resources elements corresponding to CSI-RS resources 404, 405, and 406 in this example), which make three CSI-RS resources available for transmission to UE 106 which otherwise would not have been available. Base station 102 uses these now available resources to transmit data to UE 106. Base station 102 will still use the CSI-Resources 401, 402, and 403 for the P2 sweep and can for example compare the best previous N best TRP TX beam with the current set of the N best TRP TX beams reported by UE 104 to see if the UE has moved. This embodiment is also illustrated in FIG. 8, which shows three RS transmission to UE 102 (i.e., transmissions 806, 808, and 810) and three data transmissions to UE 104 (i.e., transmissions 812, 814, and 816). The transmissions 806, 808, and 810 correspond to OFDM symbol intervals 401, 402, and 403, respectively, and transmissions 812, 814, and 816 correspond to OFDM symbol intervals 404, 405, and 406, respectively.

Figure 5A:
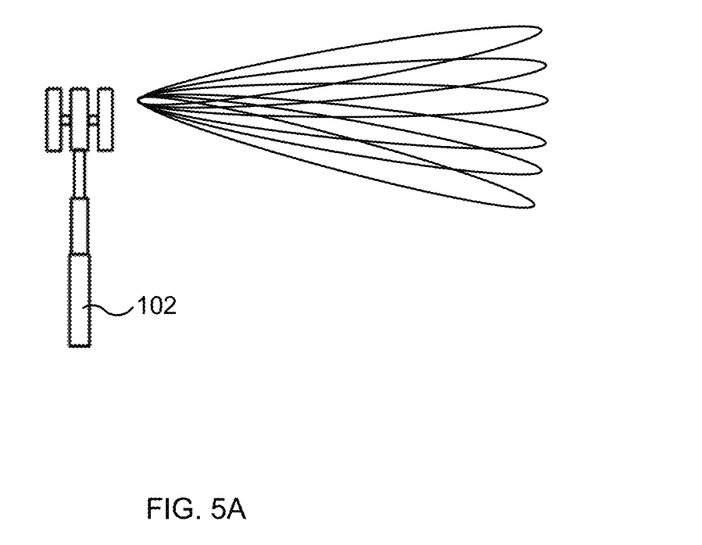
FIGS. 5A and 5B show different beam patterns.
Figure 5B:
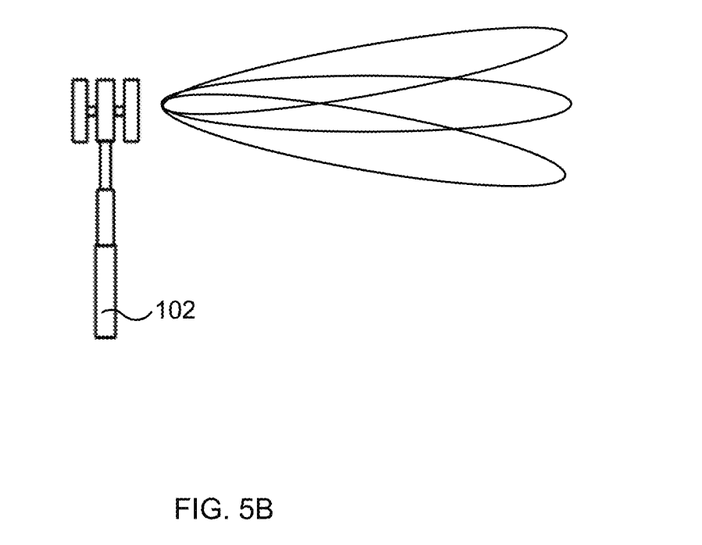

In some embodiments, when base station 102 determines to use only the three OFDM symbols 401-403 instead of the originally configured six OFDM symbols 401-406 for the P2 sweep, base station 102 may use fewer but wider TX beams for the P2 sweep. For example, FIG. 5A shows how base station 102 would have used six beams for the P2 sweep had base station 102 not decided to blank any of the resources, and FIG. 5B shows how base station may use three beams instead of six beams to perform the P2 sweep as a result of base station 102 deciding to blank three of the resources. As shown in the figures, each of the three beam used for the P2 sweep illustrated in FIG. 5B is wider than each of the narrow beams used for the P2 sweep illustrated in FIG. 5A. This technique allows base station 102 to use fewer resources (and beams) but yet evaluate an angular interval that is same as the angular interval covered by the six TX beams (but with slightly lower antenna gain).

In one embodiment, base station 102 takes the statistics of previous TRP TX beam changes for UE 104 in to account when determining which TRP beams to blank for the P2 beam sweep. For example, if a UE has used the same TRP TX beam for a long time, it is likely that the UE is more or less static, and base station 102 can then for example blank all resources for some beam sweeps (in case semi-persistent or periodic P-2 beam sweep is used).

Blank Part of Frequency Band for Beam Management Procedures

Figure 6:
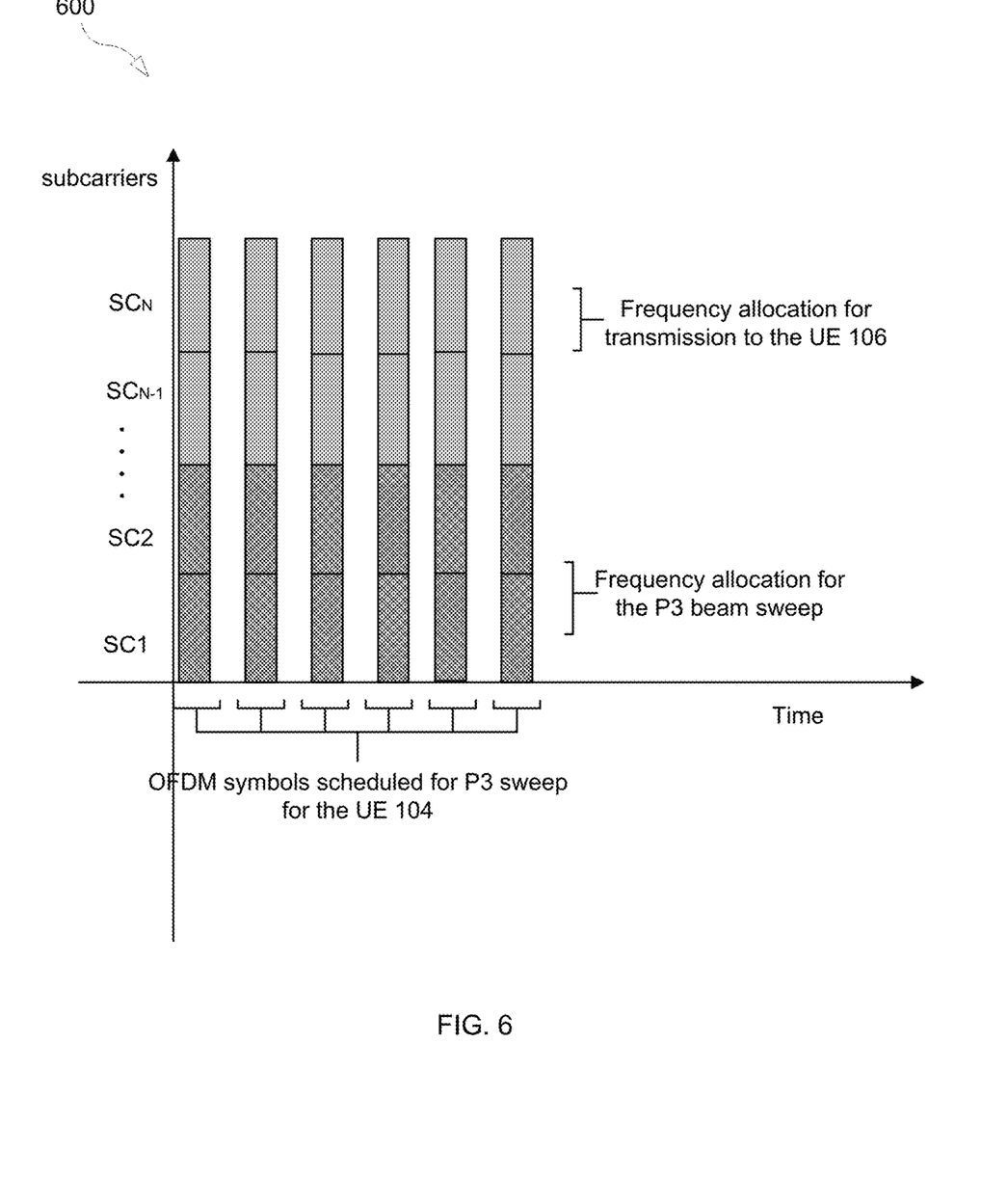
FIG. 6 illustrates the use of beam management resources according to an embodiment.

FIG. 6 illustrates an embodiment where the resources that are "blanked" are REs corresponding to particular frequencies (i.e., a particular set of subcarriers rather than a particular OFDM symbol as was the case with the embodiment shown in FIG. 4). In this example, UE 104 is configured with a CSI-RS resource set with six CSI-RS resources used for a P3 beam sweep. The time domain behavior of the CSI-RS resources can be either aperiodic, semi-persistent or periodic. During one of the P3 sweeps, base station 102 determines that it needs some resources for transmission to another UE (UE 106). It therefore blanks transmission for half of the frequency band of the CSI-RS resources and instead schedule transmission for UE 106 on those subcarriers. The UE RX beam selected as a result of this modified P3 sweep might be somewhat less reliable due to the reduce bandwidth (and that the blanked subcarriers will be perceived as noise), however it might be more important to perform transmission to UE 106 then having perfectly reliable UE RX beam selection during this moment.

In one embodiment, base station 102 has determined (for example based on received UL signals, or frequency selective CQI reports) that the quality in some subbands is poor for a certain UE, and blanks the resources in these poor subbands.

Blank One Port (One Polarization) for Beam Management Procedures

Figure 7:
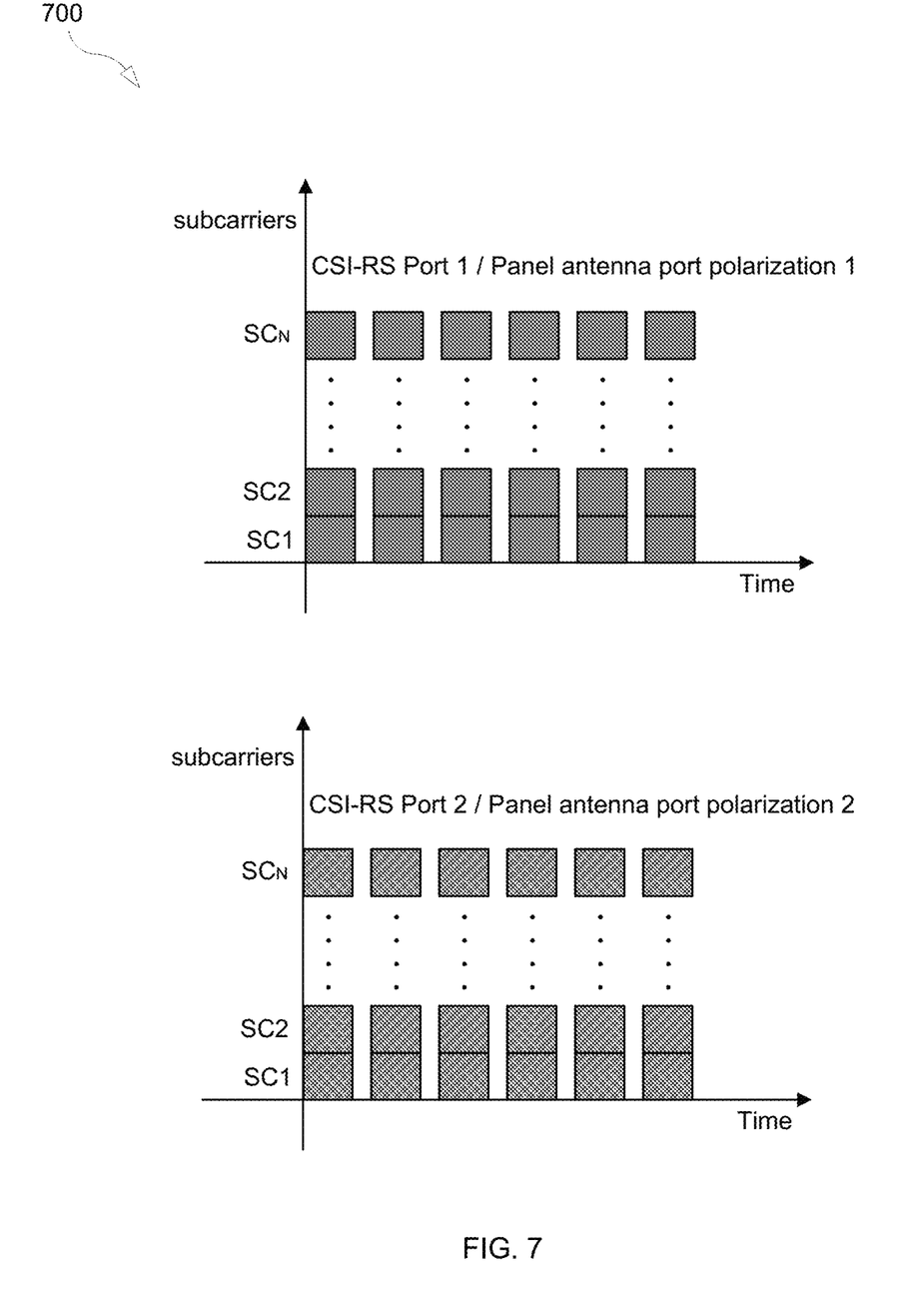
FIG. 7 illustrates the use of beam management resources according to an embodiment.

FIG. 7 illustrates an embodiment where the resource that is "blanked" is a port resource. In this example, UE 104 is configured with a CSI-RS resource set with six CSI-RS resources used for P2 beam sweep, where each CSI-RS resource has two CSI-RS ports. In this embodiment base station 102 has a panel with two polarizations, and base station 102 transmits one CSI-RS port per polarization during normal beam management procedures. The time domain behavior of the CSI-RS resources can be either aperiodic, semi-persistent or periodic.

During one of the P2 sweeps, base station 102 determines that it needs some resources for transmission to UE 106. It therefore blanks transmission of one of the two CSI-RS ports belonging to the CSI-RS resources corresponding to that P2 beam sweep. Base station 102 then uses the panel antenna port that should have been used to transmit the blanked CSI-RS ports to transmit data to UE 106. Since only one polarization is used for the P2 beam sweep instead of two, base station 102 beam selection will be a bit more un-reliable (partly also due to that the UE will perceive the blanked port as noise), however it might be more important to perform transmission to UE 106 then having perfectly reliable TRP beam selection during this moment (or for example blanking all of the resources during this moment).

Note that for a P3 beam sweep it is preferred to either blank a frequency resource or a port resource, rather than a time resource (e.g., OFDM symbol), because when an OFDM symbol is blanked in a P3 beam sweep, this might fool the UE about which UE RX beam is best. For example, assume that only the first two out of four OFDM symbols are used for the P3 beam sweep and the last two CSI-RS resources belonging to the last two out of the four OFDM symbols are blanked from transmission. In this case, the UE would only receive reference signal for the first two UE RX beams that the UE evaluates, and in case the best UE RX beam is one of the last two beams that the UE evaluates, a sub-optimal UE beam will be selected.

In some embodiments, UE 104 is not aware of the blanking of time, frequency, port resources in previous embodiments, and the UE will consider the received signal on these blanked resources as noise, which might have an additional negative effect on the beam selection reliability. Therefore, in one embodiment, base station 102 signals to UE 104 that some parts (or all) of the resources (frequency, time, ports) is blanked during a beam management procedure. This will improve the beam selection since the UE will base the beam selection only for the frequency, time, port resources that are used by base station 102. Also, the UE can save energy (e.g. by reduced processing effort) if the UE knows that it does not have to perform RSRP over all time, frequency, port resources. This signaling can be done for example using DCI.

In one embodiment base station 102 takes an estimated link budget to the UE in to account before determining if any resources (time, frequency, port) should be blanked. For example, a UE that has good DL link budget is likely to be less sensitive (for reliable beam selection) for blanking some of the frequency, port resources, and therefore it would be no problem for base station 102 to blank some frequency, port resources for UEs with good link budget. The link budget could, for example, be estimated based on beam reports from SSB bursts, earlier CSI-acquisition, estimated UL link budget from received UL signals, etc.

A combination of all three embodiments described above is possible. For example, base station 102 might choose to only transmit CSI-RS resources in half of the OFDM symbols, and only transmit one of the TWO CSI-RS ports on half the frequency band.

Figure 9:
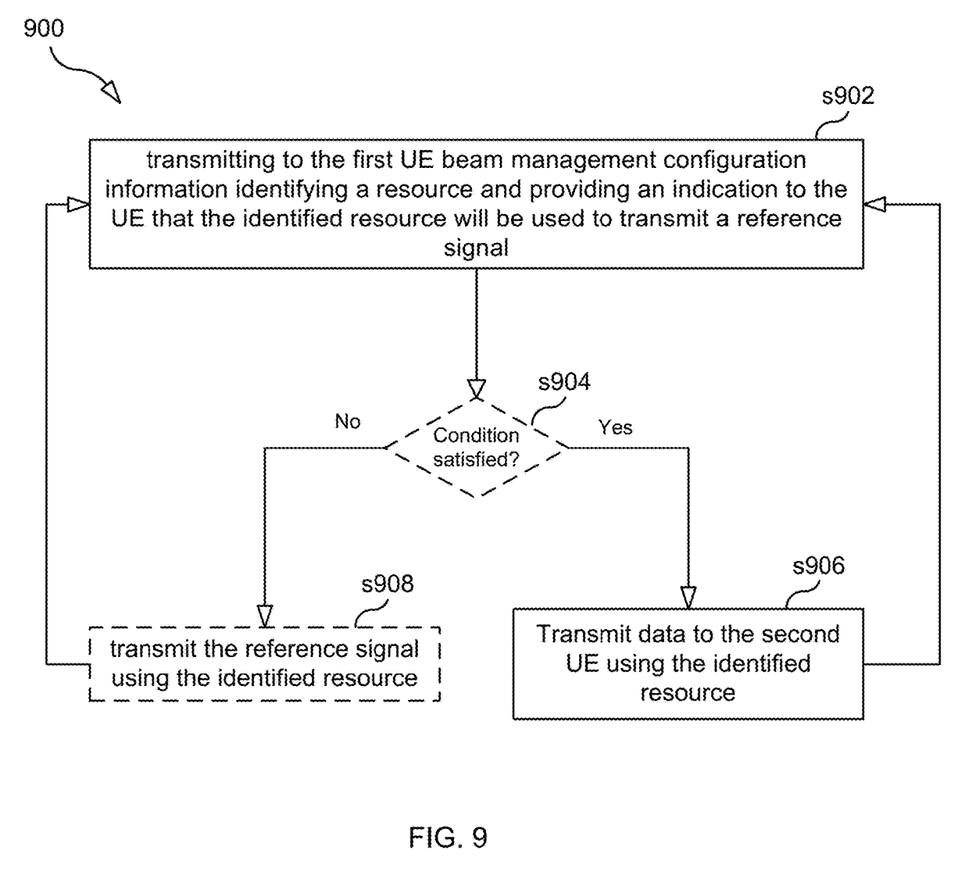
FIG. 9 is a flow chart illustrating a process according to some embodiments.

FIG. 9 is a flowchart illustrating a process 900 performed by base station 102. Process 900 may begin in step s902.

Step s902 comprises base station 104 transmitting to UE 104 beam management configuration information, the beam management configuration information identifying a resource and the beam management configuration information providing an indication to UE 104 that the identified resource will be used to transmit a reference signal for use by UE 104 in performing a beam management procedure.

Step s906 comprises base station 102 refraining from using the resource to transmit the reference signal, and, instead, using the resource to transmit data to UE 106.

As shown in FIG. 9, in some embodiments, prior to performing step s906, base station 102 determines whether a condition is satisfied (step s904), wherein step s906 is performed as a result of determining that the condition is satisfied. That is, step s906 is not performed if the condition is not satisfied, rather step s908 is performed (i.e., base station 102 transmits the reference signal using the identified resource). In some embodiments, determining whether the condition is satisfied comprises base station 102 determining a link budget for a link between base station 102 and UE 104 and comparing the link budget to a link budget threshold. In some embodiments, the condition is not satisfied if the determined link budget is less than the link budget threshold. In some embodiments, determining that the condition is satisfied comprises base station 102 determining that there are not enough resources currently available to serve UE 106. In some embodiments, the condition is not satisfied if either there are enough resources currently available to UEs other than UE 104 or the determined link budget is less than the link budget threshold.

In some embodiments, transmitting the beam management configuration information to the first UE comprises transmitting to the first UE a message comprising: i) information identifying the resource and ii) information providing the indication to the UE that the identified resource will be used to transmit the reference signal for use by the first UE in performing the beam management procedure.

In some embodiments, the message is a Radio Resource Control (RRC) message.

In some embodiments, the message is a layer 2 message (e.g., MAC CE) or a layer 1 message (DCI).

In some embodiments, process 900 further comprises, prior to transmitting the beam management configuration information to the first UE, the base station transmits to the first UE a Radio Resource Control (RRC) message comprising information identifying the resource.

In some embodiments the beam management configuration information further identifies a second resource and the beam management configuration information provides an indication to the UE that the identified first resource and second resource will be used to transmit the reference signal for use by the first UE in performing a beam management procedure, and the method further comprises the base station using the second resource to transmit the reference signal to the UE. In some embodiments the first resource is a first resource element spanning an OFDM symbol interval, and the second resource is a second resource element spanning the same OFDM symbol interval as the first resource element.

In some embodiments the identified resource is a resource element, the beam management configuration information further identifies a second resource element, and the beam management configuration information provides an indication to the UE that the identified first resource element and second resource element will be used to transmit the reference signal for use by the first UE in performing the beam management procedure, the first resource element spans an OFDM symbol interval, the second resource element spans the same OFDM symbol interval as the first resource element, and the method further comprises the base station using the second resource element to transmit the reference signal to the UE.

In some embodiments, the identified resource is a first CSI-RS resource corresponding to a first OFDM symbol, the beam management configuration information further identifies a second CSI-RS resource corresponding to a second OFDM symbol, the beam management configuration information provides an indication to the UE that both the first CSI-RS resource and the second CSI-RS resource will be used to transmit a reference signal for use by the first UE in performing the beam management procedure, and the method further comprises the base station using the second CSI-RS resource to transmit a reference signal to the UE.

In some embodiments, the beam management procedure is a P2 beam sweep, and the method further comprises the base station using statistics of previous transmit (TX) beam changes for the UE in determining which TX beams to use for the P2 beam sweep.

Figure 10:
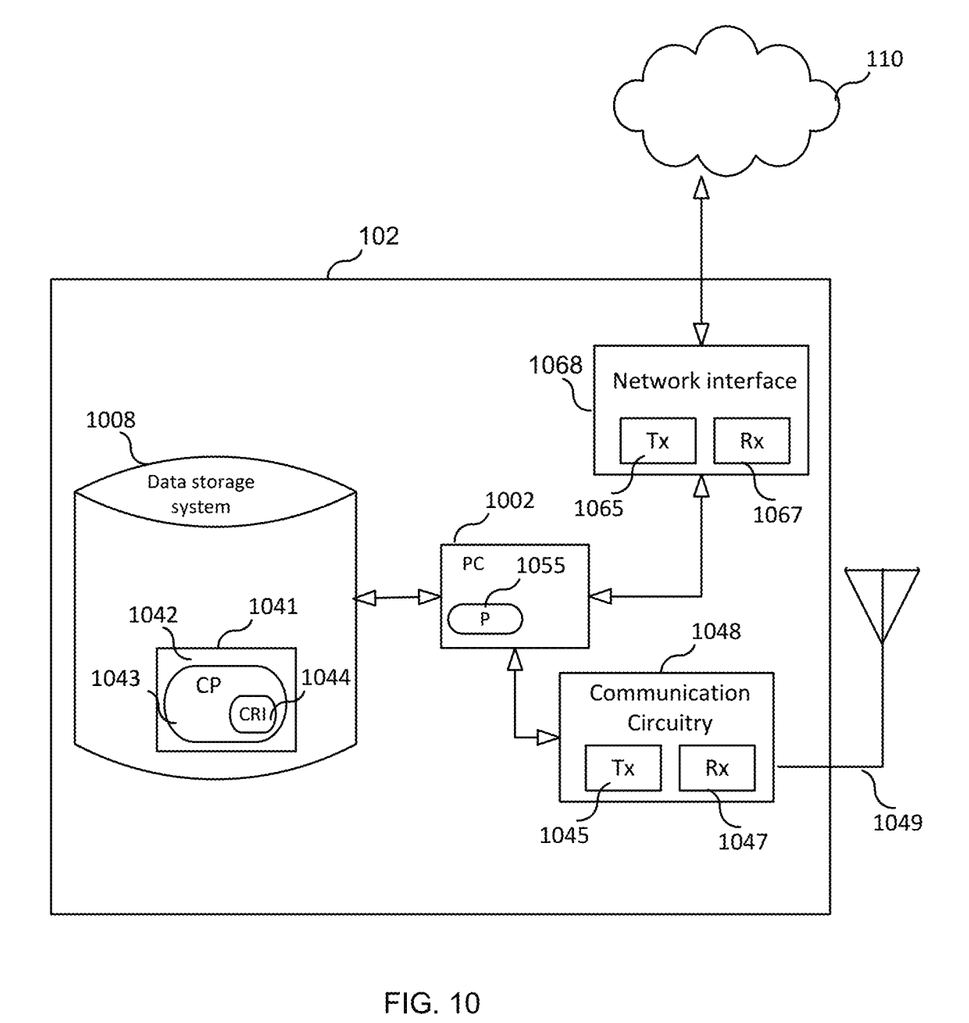
FIG. 10 is a block diagram illustrating a base station according to an embodiment.

FIG. 10 is a block diagram of base station 102, according to some embodiments. As shown in FIG. 10, base station 102 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 102 may be a distributed computing apparatus); a network interface 1068 comprising a transmitter (Tx) 1065 and a receiver (Rx) 1067 for enabling apparatus 1000 to transmit data to and receive data from other network nodes connected to a network 110 (e.g., an Internet Protocol (IP) network) to which network interface 1048 is connected; communication circuitry 1048, which is coupled to an antenna arrangement 1049 comprising one or more antennas and which comprises a transmitter (Tx) 1045 and a receiver (Rx) 1047 for enabling the base station to transmit data and receive data (e.g., wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes the base station to perform steps described herein (e.g., steps described herein with reference to the flow charts). In other embodiments, the base station may be configured to perform steps described herein without the need for code. That is, for example, PC 1002 may consist merely of one or more ASICs. Hence, the features of the embodiments described herein may be implemented in hardware and/or software.

As the above description illustrates, base station 102 can be configured to determine if a certain condition exists (e.g., determine if some of the resources (time, frequency, ports) belonging to a beam management procedure is better needed by some other UEs), and be further configured such that, if the condition exists, then base station 102 uses some parts of CSI-RS resources corresponding to a beam management procedure for transmission to another UE instead. In this way, resources can be used more efficiently.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by base station serving a first user equipment (UE), the method comprising:
    the base station transmitting to the first UE beam management configuration information, the beam management configuration information identifying a resource and the beam management configuration information providing an indication to the first UE that the identified resource will be used to transmit a reference signal for use by the first UE in performing a beam management procedure;

the base station determining that a condition is satisfied; and refraining from using the identified resource to transmit the reference signal to the first UE, and, instead, using the resource to transmit data to a second UE, wherein the base station performs the steps of refraining from using the resource to transmit the reference signal, and, instead, using the resource to transmit data to the second UE as a result of determining that the condition is satisfied.

2. The method of claim 1, wherein the resource is a time resource, a frequency resource, and/or a port resource.

3. The method of claim 1, wherein transmitting the beam management configuration information to the first UE comprises transmitting to the first UE a message comprising: i) information identifying the resource and ii) information providing the indication to the UE that the identified resource will be used to transmit the reference signal for use by the first UE in performing the beam management procedure.

4. The method of claim 3, wherein the message is a Radio Resource Control (RRC) message.

5. The method of claim 3, wherein the message is a layer 2 message or a layer 1 message.

6. The method of claim 5, further comprising:
prior to transmitting the beam management configuration information to the first UE, the base station transmitting to the first UE a Radio Resource Control (RRC) message comprising information identifying the resource.

7. The method of claim 1, wherein determining that the condition is satisfied comprises determining a link budget for a link between the base station and the first UE and comparing the link budget to a link budget threshold.

8. The method of claim 7, wherein the condition is not satisfied if the determined link budget is below the threshold.

9. A method performed by base station serving a first user equipment (UE), the method comprising:
the base station transmitting to the first UE beam management configuration information, the beam management configuration information identifying a resource and the beam management configuration information providing an indication to the first UE that the identified resource will be used to transmit a reference signal for use by the first UE in performing a beam management procedure; and
refraining from using the identified resource to transmit the reference signal to the first UE, and, instead, using the resource to transmit data to a second UE, wherein
the identified resource is a resource element,
the beam management configuration information further identifies a second resource element and the beam management configuration information provides an indication to the UE that the identified first resource element and second resource element will be used to transmit the reference signal for use by the first UE in performing the beam management procedure,
the first resource element spans an OFDM symbol interval,
the second resource element spans the same OFDM symbol interval as the first resource element, and
the method further comprises the base station using the second resource element to transmit the reference signal to the UE.

10. The method of claim 1, wherein the beam management procedure is a P2 beam sweep, and the method further comprises the base station using statistics of previous transmit (TX) beam changes for the UE in determining which TX beams to use for the P2 beam sweep.

11. The method of claim 1, wherein the identified resource is a port.

12. A computer program product comprising a non-transitory computer readable medium storing a computer program comprising instructions which when executed by processing circuitry causes the processing circuitry to perform the method of claim 1.

13. A base station, the base station comprising:
processing circuitry; and
a memory, said memory containing instructions executable by said processing circuitry, whereby said base station is operative to perform the method of claim 1.

14. A method performed by base station serving a first user equipment (UE), the method comprising:
the base station transmitting to the first UE beam management configuration information, the beam management configuration information identifying a resource and the beam management configuration information providing an indication to the first UE that the identified resource will be used to transmit a reference signal for use by the first UE in performing a beam management procedure; and
refraining from using the identified resource to transmit the reference signal to the first UE, and, instead, using the resource to transmit data to a second UE, wherein
the identified resource is a first CSI-RS resource corresponding to a first OFDM symbol,
the beam management configuration information further identifies a second CSI-RS resource corresponding to a second OFDM symbol,
the beam management configuration information provides an indication to the UE that both the first CSI-RS resource and the second CSI-RS resource will be used to transmit a reference signal for use by the first UE in performing the beam management procedure, and
the method further comprises the base station using the second CSI-RS resource to transmit a reference signal to the UE.

15. A base station, the base station comprising:
processing circuitry; and
a memory, said memory containing instructions executable by said processing circuitry, whereby said base station is operative to perform the method of claim 9.

16. A base station, the base station comprising:
processing circuitry; and
a memory, said memory containing instructions executable by said processing circuitry, whereby said base station is operative to perform the method of claim 14.

* * * * *